United States Patent
Birkwald et al.

(10) Patent No.: US 8,235,165 B2
(45) Date of Patent: Aug. 7, 2012

(54) ELECTROMECHANICAL POWER STEERING SYSTEM WITH A BALL SCREW DRIVE

(75) Inventors: Frank Birkwald, Ostfildern (DE); Alexander Kiforiuk, Ebersbach an der Fils (DE)

(73) Assignee: ThyssenKrupp Presta AG, Eschen (LI)

( * ) Notice: Subject to any disclaimer, the term of this patent is extended or adjusted under 35 U.S.C. 154(b) by 345 days.

(21) Appl. No.: 12/628,704

(22) Filed: Dec. 1, 2009

(65) Prior Publication Data
US 2012/0024616 A1 Feb. 2, 2012

(51) Int. Cl.
*B62D 5/04* (2006.01)
(52) U.S. Cl. .................................................... 180/444
(58) Field of Classification Search ................. 180/444; 74/388 PS, 424.82
See application file for complete search history.

(56) References Cited

U.S. PATENT DOCUMENTS

| | | | | |
|---|---|---|---|---|
| 4,415,054 A * | 11/1983 | Drutchas | ...................... | 180/444 |
| 4,572,314 A * | 2/1986 | Anguera | ...................... | 180/444 |
| 4,656,409 A * | 4/1987 | Shimizu | ........................ | 318/689 |
| 4,987,788 A | 1/1991 | Bausch | | |
| 5,083,626 A | 1/1992 | Abe et al. | | |
| 5,650,701 A * | 7/1997 | Shimizu et al. | ............... | 318/489 |
| 5,975,234 A * | 11/1999 | Bugosh et al. | ................ | 180/444 |
| 5,988,311 A * | 11/1999 | Kuribayashi et al. | ......... | 180/444 |
| 6,179,083 B1 * | 1/2001 | Yamauchi | ...................... | 180/444 |
| 6,637,540 B2 * | 10/2003 | Kielar et al. | ................... | 180/402 |
| 6,729,433 B2 * | 5/2004 | Uryu et al. | .................... | 180/444 |
| 6,883,635 B2 * | 4/2005 | Lynn et al. | .................... | 180/444 |
| 7,878,294 B2 * | 2/2011 | Morikawa | ...................... | 180/444 |

FOREIGN PATENT DOCUMENTS

| | | |
|---|---|---|
| DE | 3735517 A1 | 5/1988 |
| DE | 3836255 A1 | 4/1990 |
| DE | 102006061949 A1 | 7/2008 |
| EP | 1553006 A1 | 7/2005 |
| EP | 1813506 A1 | 8/2007 |

* cited by examiner

*Primary Examiner* — Tony Winner
(74) *Attorney, Agent, or Firm* — Connolly Bove Lodge & Hutz LLP

(57) ABSTRACT

An electromechanical power steering system with a ball screw drive may include a hollow shaft motor with a stator secured to the housing and a rotatably mounted rotor arranged coaxially with a longitudinal axis of, and which may be drivingly connected to, a hollow shaft. The system may further include a ball screw nut arranged coaxially with the longitudinal axis, and which may drive a ball screw spindle via balls. The rotor may drive the ball screw nut via a reduction gear.

8 Claims, 2 Drawing Sheets

ELECTROMECHANICAL POWER STEERING SYSTEM WITH A BALL SCREW DRIVE

FIELD OF ENDEAVOR

The present invention relates to an electromechanical power steering system with a ball screw drive as claimed in the pre-characterizing clause of claim 1.

BACKGROUND

Ball screw drives are used in vehicles above all in steering gears. The purpose of the ball screw drive is in this case to convert a rotary movement of an electromotive drive into a translatory movement. A conversion of the rotary movement into a translatory movement is required in the steering gear in order to bring about a translatory movement of a tie rod.

In the prior art, this is described for example in DE 102006061949 A1 and EP 1553006 A1.

In DE 102006061949 A1, a rotational movement is generated by an electric servomotor. The rotational movement is supplied via a rotor shaft to a clutch and then directly to a gear. The rotor shaft is embodied as a hollow shaft. The built-in gear is in this case designed as a circulating ball gear. The rotational movement of the servomotor is converted by the circulating ball gear into a translatory movement of a ball screw spindle. The servomotor takes up quite a lot of space because it has to run, on account of the direct drive of the ball nut, slowly and with high torque. The servomotor is also relatively heavy; this has an adverse effect on the fuel consumption of the vehicle.

In EP 1553006 A1, the power for the translatory movement of the ball screw spindle is transmitted by a pulley, which is operated by a drive belt, to the ball screw spindle via a ball screw nut and balls. The drive power is in this case transmitted by an electric motor to the drive belt. This drive variant of the ball screw spindle has the drawback that the toothed belt is an expensive component on account of the stringent demands placed on its service life.

DE 3735517 C2 discloses an actuator for actuating a rear-axle steering system with a screw spindle, a hollow shaft motor and a reduction gear designed as a planetary gear. In this gear, the hollow wheel is connected to the ball nut, the planet carrier is secured to the housing and the sun wheel is connected to the motor shaft. This arrangement has a relatively long overall length and the ball nut is mounted at both ends with ball bearings.

DE 3836255 C2 discloses a similar actuator for rear-wheel steering with a hollow shaft motor, a circulating ball assembly and a planetary gear. The hollow shaft motor drives the sun wheel, the hollow wheel is secured to the housing and the planet carrier is connected to the ball nut. Complex mounting both of the ball nut and of the rotor in relation to the ball nut is required in this case too.

EP 1813506 A1 discloses an electric power steering system with a hollow shaft motor and planetary rolling gear. In this case, the planets are designed as elongate screw spindles. The sun wheel is the screw spindle of the toothed rack. A circulating ball assembly is not provided.

The object of the invention is therefore to provide a drive for the translatory movement of the ball screw spindle that takes up less space, has a lighter motor and has to produce a lower drive torque.

The object is achieved by a power steering system of claim 1; the further sub-claims specify expedient developments.

SUMMARY OF VARIOUS EMBODIMENTS

The solution according to the invention provides an electromechanical power steering system with a ball screw drive that has a hollow shaft motor with a stator which is secured to the housing and a rotatably mounted rotor which is arranged coaxially with a longitudinal axis and is drivingly connected to a hollow shaft, a ball screw nut which is arranged coaxially with the longitudinal axis and drives a ball screw spindle via balls, the rotor driving the ball screw nut via a reduction gear in the form of a planetary gear and the sun wheel being fixed between a housing and a steering housing. The sun wheel is fastened to webs of the housing and the steering housing screws. In this case, the part of the sun wheel that has teeth protrudes into the housing and extends coaxially with the longitudinal axis.

The use of the reduction gear ensures that a lower drive torque is required in order to drive the ball screw spindle than in the solutions documented in the prior art. Therefore, a drive motor which consumes less power can carry out the driving of the power steering system. As the torque which an electric motor outputs is roughly proportional to the diameter of its armature, the weight of the power steering system is reduced when selecting an electric motor with lower power and lower torque. That leads to a fuel saving. Furthermore, less overall space is required for the smaller electric motor.

In the power steering system, the hollow shaft has an internal toothing which forms a hollow wheel of a planetary gear, the ball screw nut being connected to a planet carrier carrying planet wheels, and the planet wheels of the planetary gear meshing with a sun wheel which is secured to the housing.

The use of a planetary gear as a step-down gear is a possibility to generate a step-down. The planetary gear has, in the power steering system according to the invention, at least two planet wheels. The compact design could be achieved above all as a result of the use of the planetary gear.

The ball screw spindle penetrates the sun wheel coaxially with the longitudinal axis.

This construction allows the sun wheel to be accommodated together with the planet wheels, the hollow wheel, rotor and armature compactly in a housing. This leads to a saving of space.

The planet wheels are mounted on bolts of a planet carrier which is rotationally engaged or integral with the ball screw nut.

The construction has the advantage that a rotary movement of the planet wheels is transmitted by the bolts directly to the ball screw nut. There are no further components that would reduce the efficiency of the power steering system.

The ball screw spindle can be moved—as a function of the direction of rotation of the hollow shaft motor—in the plane of the figures along the longitudinal axis to the right R or left L.

The direction of rotation of the hollow shaft motor is dependent on the polarity. It is therefore easy to change the direction of rotation by changing the polarity.

The ball screw nut is designed in one piece together with bolts.

This construction offers advantages in terms of production and with regard to strength. The one-piece design allows production as a cast part. The strength of the ball screw nut is positively influenced in that, as a result of the production technology applied, stress peaks—such as occur for example in welded workpieces—do not occur or occur to a much lesser degree. Mechanical remachining—for example by milling—has the purpose of bringing the workpiece to its desired size.

The rotor is designed in one piece.

The rotor has the form of a straight hollow cylinder, at one end of which a hollow shaft is embodied. The hollow shaft has an engagement region which has on an inner side a spur toothing. Alternatively thereto, the hollow shaft can have in its engagement region an oblique toothing. The one-piece design allows a cost-effective production, for example by casting and subsequent machining by milling. The course of the mechanical stresses in the rotor is positively influenced as a result, because the production of stress peaks is in this way reduced.

The power steering system has a bearing which has the purpose, in addition to the ball screw nut, of accommodating radial forces. This reduces the loading of the ball screw nut.

BRIEF DESCRIPTION OF THE DRAWINGS

An exemplary embodiment of the invention will be described hereinafter with reference to the drawings, in which.

DETAILED DESCRIPTION OF VARIOUS EMBODIMENTS

Figure 1:
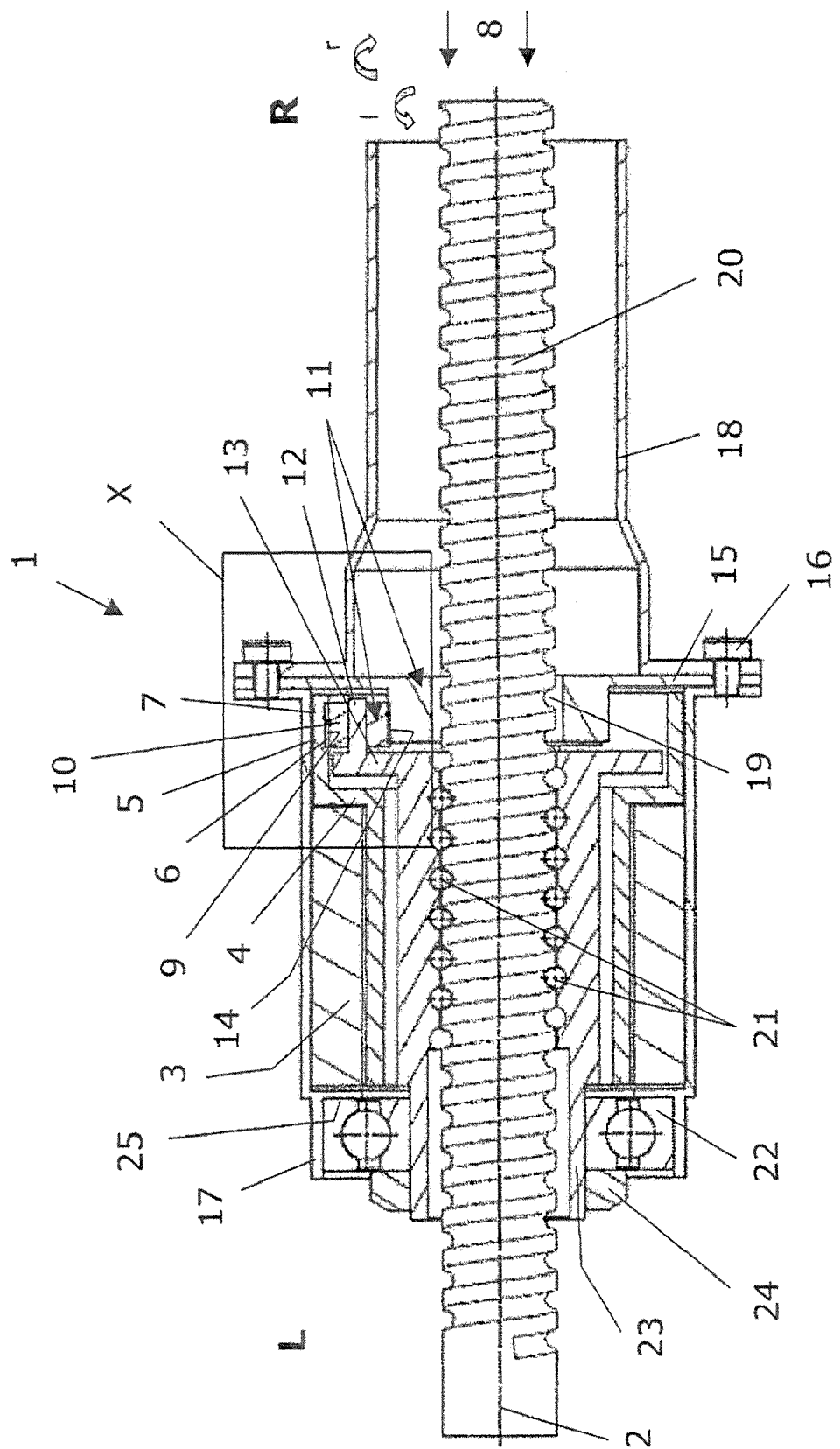
FIG. 1 is a longitudinal section through an electromechanical power steering system with a ball screw drive.

FIG. 1 is a longitudinal section through an electromechanical power steering system with a ball screw drive 1 along the longitudinal axis 2 thereof.

The drive of the electromechanical power steering system with a ball screw drive 1 consists of a permanently excited hollow shaft motor. The hollow shaft motor has in this case a hollow cylindrical form. It consists of a stator 3 and an armature 4. The armature 4 is sunk into the stator 3. Stator 3 and armature 4 are positioned coaxially with the longitudinal axis 2. The armature 4 is rotatable about the longitudinal axis 2 and has a hollow cylinder-like form. The armature 4 has an engagement region 5 which is provided with an internal toothing 6. The internal toothing 6 is designed preferably as spur toothing. Alternatively thereto, it can be designed as oblique toothing. The armature 4 rotates about the longitudinal axis 2. Looking from a position 8 onto the power steering system, the armature 4 can perform rotations to the right r or left l about the longitudinal axis 2. The internal toothing 6 of the armature 4 engages with a toothing 9 of planet wheels 10 which are part of a planetary gear 11. Of the at least two planet wheels 10, just one is indicated in this figure. The toothing 9 is also designed as spur toothing. Alternatively, the toothing 9 can be designed as oblique toothing.

The planet wheels 10 are rotatably mounted on bolts 12 of a ball screw nut 13. The ball screw nut 13 is designed in one piece with the bolts 12.

The planet wheels 10 engage with a toothing 14 of a sun wheel 15 which is part of the planetary gear 11. The toothing 14 is designed preferably as spur toothing. Alternatively thereto, an oblique toothing can be implemented.

The sun wheel 15 is fixed between a housing 17 and a steering housing 18 by means of a releasable connection which is designed as a screw connection 16. The sun wheel 15 is integrated in the housing 17 coaxially with the longitudinal axis 2. The sun wheel 15 protrudes with its toothed region completely into the housing 17.

The sun wheel 15 has at its center a through-hole 19. A ball screw spindle 20 with balls 21 leads through the through-hole 19. The ball screw spindle 20 is arranged coaxially with the longitudinal axis 2. The ball screw spindle 20 penetrates the ball screw nut 13 coaxially with the longitudinal axis 2.

A torque is transmitted from the ball screw nut 13 to the ball screw spindle 20 via the balls 21.

In this illustration, the ball screw spindle protrudes in the plane of the figures on both sides, to the right and to the left, beyond edge regions of the housing 17 and the steering housing 18.

The housing 17 has, in addition to the stator 3, the armature 4, the ball screw nut 13, the planetary gear 11, the ball screw spindle 20 and the balls 21, also a bearing 22 which is designed preferably as a deep groove ball bearing. Alternatively, designs as rolling bearings and needle bearings are possible. The bearing 22 is slid in the illustration at the left end of the ball screw nut 13 on a shoulder 23 of the ball screw nut 13. The bearing 22 serves, in addition to the ball screw spindle 20, to accommodate forces acting perpendicularly to the longitudinal axis 2. The ball bearing 22 is secured against longitudinal movements toward the left L in the plane of the figures by a grooved nut 24 which is screwed onto the ball screw nut 13. The ball bearing 22 is secured against longitudinal displacement toward the right R in the plane of the figures by a stop on a wall 25 of the housing 17.

In this electromechanical power steering system with a ball screw drive 1, the rotary movement of the hollow shaft motor is converted into a translatory movement of the ball screw spindle 20. Depending on the direction of rotation of the hollow shaft motor, the ball screw spindle 20 displays a translatory movement directed toward the right R or left L.

During a rotary movement of the hollow shaft motor, the armature 4 rotates firstly about the longitudinal axis 2. Depending on the polarity of the hollow shaft motor, the armature 4 performs a rotation toward the right r or left l about the longitudinal axis 2 from the viewpoint 8 of an observer looking onto the ball screw spindle 20. The rotary movement is transmitted to the planet wheels 10 via the internal toothing 6 pertaining to the armature 4. The planet wheels 10 transmit the rotary movement to the ball screw nut 13 via the bolts 12. The ball screw nut 13 transmits a torque to the ball screw spindle 20 by means of the balls 21. Depending on the direction of rotation of the ball screw nut 13, the ball screw spindle 20 performs a translatory movement toward the left L or right R in the plane of the figures. In this case, the direction of rotation of the ball screw nut 13 is defined by the direction of rotation of the armature 4.

The above-described driving of the ball screw spindle 20 by the hollow shaft motor includes a transmission of movement with a—constant—step-down. The step-down is generated by the internal toothing 6 of the armature 4 with the planet wheels 10. The planetary gear 11 ensures in this case a compact design of this device. This design reduces the weight and thus ensures that fuel is saved. As an alternative to the use of the planetary gear 11, a different step-down gear can also be used.

Gears of the above-described type have a more compact design than conventional EPS gears or drives with drive belts. The saving of weight resulting therefrom meets the demand to save fuel. The use of the planet wheel gear 11 allows the use of a motor—in this case the use of a hollow shaft motor—which requires a lower torque than a motor in a conventional EPS gear. The torque of an electric motor is roughly proportional to its diameter. This leads, on account of the solid design of motors of this type, to a reduction in weight in electric motors having a relatively small diameter.

Figure 2:
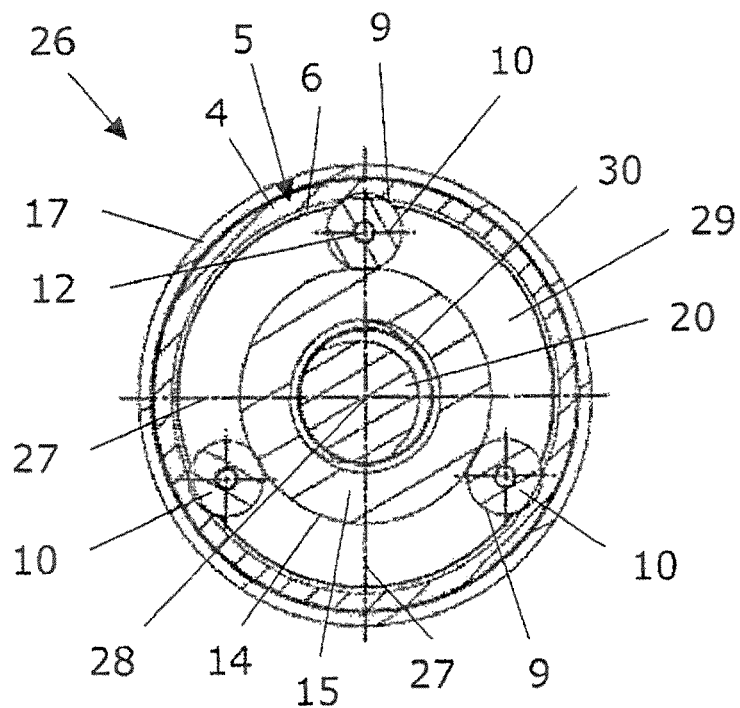
FIG. 2 is a cross section perpendicular to a longitudinal axis of the electromechanical power steering system with a ball screw drive; and also

FIG. 2 is a cross section 26 through the electromechanical power steering system with a ball screw drive 1. This figure is shown concentrically in a Cartesian coordinate system 27. A center point 28 of this Cartesian coordinate system 27 is indicated by a projection of the longitudinal axis 2.

The cross section 26 extends perpendicularly to the longitudinal axis 2. The illustration shows in the outermost region a section through the housing 17. Shown directly below the housing 17 is the armature 4, with its surrounding engagement region 5 which has the internal toothing 6.

The internal toothing 6 of the armature 4 meshes with the toothing 9 of the planet wheels 10 which are arranged in the inner region of the armature 4. Three planet wheels 10 are shown in this illustration. In the solution according to the invention, two planet wheels 10 have to mesh at least with the internal toothing 6. The three planet wheels 10 are part of the planet wheel gear 11.

The longitudinal section 1 shows just one planet wheel 10, as the other two planet wheels 10 are not positioned in the sectional plane.

The bolts 12, to which the planet wheels 10 are attached, are each shown in FIG. 2 as concentric circles. The toothings 9 of the planet wheels 10 engage with the toothing 14 of the sun wheel 15. The toothing 9 of the planet wheels 10 and the toothing 14 of the sun wheel 15 are indicated in this illustration as solid lines.

A non-hatched circular region 29 represents the plane of rotation of the planet wheels 10 about the sun wheel 15.

An arc of a circle-shaped region 30 represents ball screw turns in which the balls 21 are transported. None of the balls 21 are shown in this figure.

Figure 3:
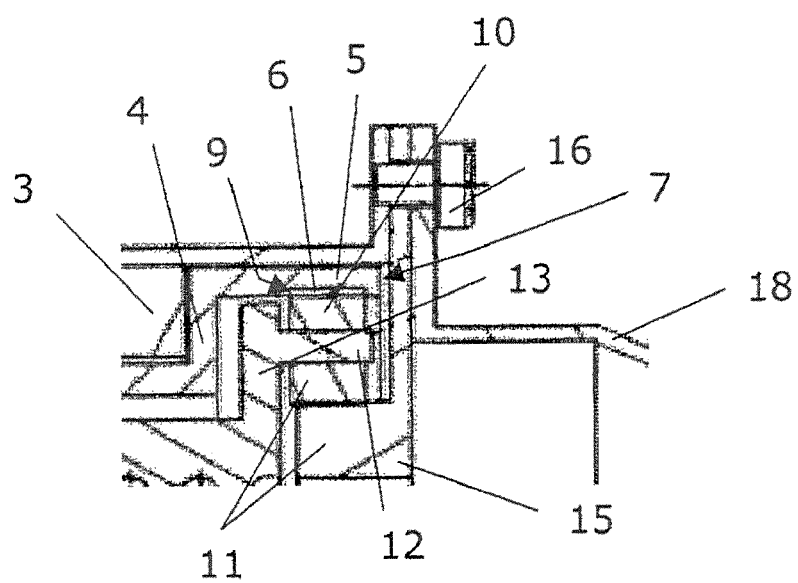
FIG. 3 is an enlarged view of the region marked by broken lines in FIG. 1.

FIG. 3 is an enlarged view of the detail of the elements which in FIG. 1 are enclosed by a broken line and denoted by an X.

This illustration shows particularly clearly the engagement region 5, the hollow shaft 7 of the armature 4 with the internal toothing and the toothing of the planet wheels 9.

A particular advantage of the embodiment shown in FIG. 1 is the fact that the hollow shaft motor coaxially surrounds the ball nut, the ball nut being mounted in a ball bearing only on one side. A needle bearing can be provided for mounting the rotor in relation to the ball nut. It is therefore necessary to provide fewer bearings than in the prior art. In addition, the assembly of the sun wheel in the described manner allows the entire gear unit to be assembled from the flange of the housing 17. This greatly simplifies assembly in the cup-shaped housing.

LIST OF REFERENCE NUMERALS

1. Electromechanical power steering system with a ball screw drive—longitudinal section
2. Longitudinal axis
3. Stator
4. Rotor
5. Engagement region armature—internal
6. Internal toothing of the engagement region 5
7. Hollow shaft
8. Position: looking onto the power steering system from one side
9. Toothing of planet wheels
10. Planet wheel
11. Planetary gear
12. Bolts
13. Ball screw nut with bolts
14. Toothing of a sun wheel 15
15. Sun wheel
16. Screw connection
17. Housing
18. Steering housing
19. Through-hole
20. Ball screw spindle
21. Balls
22. Bearing
23. Shoulder of the ball screw nut 13
24. Grooved nut
25. Wall
26. Electromechanical power steering system with a ball screw drive—cross section
27. Cartesian coordinate system
28. Center point
29. Plane of rotation of the planet wheels 10
30. Ball screw turns

What is claimed is:

1. An electromechanical power steering system with a ball screw drive, having:
    a hollow shaft motor with a stator which is secured to a housing and a rotatably mounted rotor, which is arranged coaxially with a longitudinal axis of, and which is drivingly connected to, a hollow shaft,
    a ball screw nut which is arranged coaxially with the longitudinal axis, and which is configured to drive a ball screw spindle via balls,
    wherein the rotor is configured to drive the ball screw nut via a reduction gear embodied as a planetary gear, and wherein the planetary gear comprises a sun wheel which is mounted in a stationary fashion between a housing and a steering housing.

2. The power steering system as claimed in claim 1, wherein
    the hollow shaft has an internal toothing which forms a hollow wheel of the planetary gear,
    wherein the ball screw nut is connected to a planet carrier carrying planet wheels and
    wherein the planet wheels of the planetary gear mesh with the sun wheel which is secured to the housing.

3. The power steering system as claimed in claim 1, wherein the ball screw spindle penetrates the sun wheel coaxially.

4. The power steering system as claim in claim 1, wherein the planet wheels are mounted on bolts of the ball screw nut.

5. The power steering system as claimed in claim 1, wherein the ball screw nut is designed in one piece with bolts.

6. The power steering system as claimed in claim 1, wherein the rotor is designed in one piece with the hollow wheel.

7. The power steering system as claimed in claim 1, wherein the hollow shaft motor is a permanently excited electric motor.

8. The power steering system as claimed in claim 1, wherein the sun wheel is mounted between the steering housing and the housing by means of a connection that couples the steering housing to the housing.

* * * * *